(12) United States Patent
Bernardinis

(10) Patent No.: US 9,631,980 B2
(45) Date of Patent: Apr. 25, 2017

(54) TEMPERATURE SENSOR SYSTEM AND METHOD

(71) Applicant: Analog Devices, Inc., Norwood, MA (US)

(72) Inventor: Gabriele Bernardinis, Los Gatos, CA (US)

(73) Assignee: Analog Devices, Inc., Norwood, MA (US)

( * ) Notice: Subject to any disclaimer, the term of this patent is extended or adjusted under 35 U.S.C. 154(b) by 632 days.

(21) Appl. No.: 14/033,917

(22) Filed: Sep. 23, 2013

(65) Prior Publication Data

US 2014/0341257 A1 Nov. 20, 2014

Related U.S. Application Data

(60) Provisional application No. 61/824,809, filed on May 17, 2013.

(51) Int. Cl.
*G01K 7/01* (2006.01)
(52) U.S. Cl.
CPC ...................... *G01K 7/01* (2013.01)
(58) Field of Classification Search
CPC ................................ G01K 7/015; G01K 7/01
USPC ......................................................... 374/178
See application file for complete search history.

(56) References Cited

U.S. PATENT DOCUMENTS

| 7,410,293 | B1* | 8/2008 | Santurkar | G01K 7/015 327/512 |
| 2004/0162697 | A1* | 8/2004 | Smith | G06F 1/206 702/132 |
| 2006/0029123 | A1* | 2/2006 | Johnson | G01K 15/00 374/178 |
| 2006/0265174 | A1* | 11/2006 | Doyle | G01K 1/026 702/130 |

(Continued)

FOREIGN PATENT DOCUMENTS

EP 2295944 3/2011

OTHER PUBLICATIONS

"Using Anti-Parallel Diodes (APD) with SMSC Temperature Sensing Devices", SMSC Success by Design AN 16.4 Revision 1.2 (Apr. 1, 2009), (2007), 9 pgs.

(Continued)

*Primary Examiner* — Lisa Caputo
*Assistant Examiner* — Philip Cotey
(74) *Attorney, Agent, or Firm* — Schwegman Lundberg & Woessner, P.A.

(57) ABSTRACT

A temperature sensing system can include first and second temperature sensing circuits and a digitizing encoder. The first and second temperature sensing circuits can include respective devices with semiconductor junction areas. Temperature information can be determined from one or more characteristic signals measured from the temperature sensing circuits. A feedback circuit can be configured to provide one or more offset signals to the digitizing encoder. The one or more offset signals can correspond to components or (Continued)

characteristics of the first and second temperature sensing circuits. In an example, at least one of the first and second temperature sensing circuits can include an adjustable load circuit for use with the other of the first and second temperature sensing circuits.

15 Claims, 12 Drawing Sheets

(56) References Cited

U.S. PATENT DOCUMENTS

| | | | | |
|---|---|---|---|---|
| 2008/0317086 | A1* | 12/2008 | Santos | G01K 7/00 374/1 |
| 2009/0285261 | A1* | 11/2009 | Casey | G01K 7/015 374/178 |
| 2010/0002747 | A1 | 1/2010 | Bosch et al. | |
| 2010/0161261 | A1* | 6/2010 | Drapkin | G01K 7/01 702/65 |
| 2011/0234300 | A1* | 9/2011 | Zhang | G01K 7/01 327/512 |
| 2011/0254618 | A1* | 10/2011 | Snowdon | G01K 7/22 327/564 |
| 2013/0136149 | A1 | 5/2013 | Soenen et al. | |

OTHER PUBLICATIONS

"IN400x Diode Family Forward Voltage", [online]. [retrieved on Sep. 28, 2013]. Retrieved from the Internet: <http://www.cliftonlaboratories.com/1n400x_diode_family_forward_voltage.htm>, (2013), 14 pgs.

Sherry, Adrian, "Chopping on Sigma-Delta ADCs", AN-609 Application Note. [online], [retrieved on Sep. 28, 2013]. Retrieved from the Internet: http://www.analog.com/static/imported-files/application_notes/AN-609.pdf>, (2013), 4 pgs.

Sofia, John W, "Electrical temperature measurement using semiconductors", [online]. [retrieved on Sep. 28, 2013]. Retrieved from Internet: <http://www.electronics-cooling.com/1997/01/electrical-temperature-measurement-using-semiconductors/>, (2013), 6 pgs.

Todsen, Jim, "The Offset DAC", Application Report, SBAA077. [online]. [retrieved on Sep. 28, 2013]. Retrieved from the Internet: <http://www.ti.com/lit/an/sbaa077/sbaa077.pdf>, (Sep. 2002), 4 pgs.

* cited by examiner

| | ADC OFFSET CALIBRATION | $I_{111}$ | $I_{112}$ | MUX 115 | $S_{321}$ | $I_{221}$ | $I_{222}$ | $I_{223}$ | $I_{224}$ | $\Delta V_{BE}$ | $I_{118}$ | MUX 116 |
|---|---|---|---|---|---|---|---|---|---|---|---|---|
| ROW 0 | | 1x | 10x | $I_{111}$-$D_{221}$ | N/A | N/A | N/A | N/A | N/A | N/A | N/A | 2&4 |
| ROW 1 | INTERNAL | 1x | 10x | $I_{111}$-$D_{221}$<br>$I_{112}$-$D_{222}$ | OPEN | 1x | 10x | N/A | N/A | +X | | 1&2 |
| ROW 2 | | 1x | 10x | $I_{111}$-$D_{222}$<br>$I_{112}$-$D_{221}$ | OPEN | 10x | 1x | N/A | N/A | -X | | 3&4 |
| ROW 3 | | 2x | 20x | $I_{111}$-$D_{221}$<br>$I_{112}$-$D_{222}$ | OPEN | 2x | 20x | N/A | N/A | +X | | 1&2 |
| ROW 4 | | 2x | 20x | $I_{111}$-$D_{222}$<br>$I_{112}$-$D_{221}$ | OPEN | 20x | 2x | N/A | N/A | -X | | 3&4 |
| ROW 5 | EXTERNAL; $D_{223}$ | 1x | 10x | $I_{111}$-$D_{223}$-$D_{221}$<br>$I_{112}$-$D_{221}$ | OPEN | 11x | 0 | 1x | 0 | | -X | 3&4 |
| ROW 6 | | 1x | 10x | $I_{111}$-$D_{223}$-$D_{221}$<br>$I_{112}$-$D_{221}$ | OPEN | 11x | 0 | 10x | 0 | | -X | 3&4 |
| ROW 7 | | 2x | 20x | $I_{111}$-$D_{223}$-$D_{221}$<br>$I_{112}$-$D_{221}$ | CLOSED | 11x | 11x | 2x | 0 | | -X | 3&4 |
| ROW 8 | | 2x | 20x | $I_{111}$-$D_{223}$-$D_{221}$<br>$I_{112}$-$D_{221}$ | CLOSED | 11x | 11x | 20x | 0 | | -X | 3&4 |
| ROW 9 | EXTERNAL; $D_{224}$ | 1x | 10x | $I_{111}$-$D_{224}$-$D_{221}$<br>$I_{112}$-$D_{221}$ | OPEN | 11x | 0 | 0 | 1x | | +X | 1&2 |
| ROW 10 | | 1x | 10x | $I_{111}$-$D_{224}$-$D_{221}$<br>$I_{112}$-$D_{221}$ | OPEN | 11x | 0 | 0 | 10x | | +X | 1&2 |
| ROW 11 | | 2x | 20x | $I_{111}$-$D_{224}$-$D_{221}$<br>$I_{112}$-$D_{221}$ | OPEN | 11x | 11x | 0 | 2x | | +X | 1&2 |
| ROW 12 | | 2x | 20x | $I_{111}$-$D_{224}$-$D_{221}$<br>$I_{112}$-$D_{221}$ | OPEN | 11x | 11x | 0 | 20x | | +X | 1&2 |

ROW 5 ← REFERENCE; ROW 9 ← REFERENCE

*FIG. 6*

TEMPERATURE SENSOR SYSTEM AND METHOD

CLAIM OF PRIORITY

This patent application claims the benefit of priority, under 35 U.S.C. Section 119(e), to U.S. Provisional Patent Application Ser. No. 61/824,809, filed on May 17, 2013, which is hereby incorporated by reference herein in its entirety.

TECHNICAL FIELD OF THE DISCLOSURE

The technical field of this disclosure includes temperature sensors and methods, and more particularly, but not by way of limitation, includes temperature sensors and methods using an electronic circuit for temperature sensing.

BACKGROUND

Semiconductor junctions can be influenced by temperature, and electrical measurements of semiconductor devices can be used for temperature sensing. An electrical signal from a semiconductor device, such as from a diode or a transistor, can be used to provide information about the device's junction temperature. Electrical signals that include temperature information can include, among others, a diode forward voltage, a transistor saturation voltage, or a transistor gate turn-on voltage.

In some examples, a temperature change can be indicated by identifying differences between two or more electrical signals (e.g., between two diode forward voltages) received or measured from semiconductor devices. In some examples, temperature information can be received in response to multiple different stimulation signals that are applied to the same semiconductor junction. In some examples, similar stimulation signals can be applied to multiple devices, such as devices having different semiconductor junction areas.

An analog electrical signal that includes information about a junction temperature can be encoded or digitized, such as using a sigma-delta analog-to-digital converter (ADC) circuit. An ADC circuit can convert an analog input signal, such as received from a semiconductor device, and convert it into a digital signal, such as a signal that includes information about a semiconductor junction temperature. The digital signal can then be made available to downstream devices and processes. For example, a feedback loop for a device temperature control system can use the digital signal to initiate or adjust a heating or cooling process.

Overview

The present inventor has recognized, among other things, that a problem to be solved can include providing a temperature-indicating electrical signal based on one or more analog signals from on-die and off-die circuits, such as using a single digital encoder circuit. The present inventor has recognized that a further problem to be solved can include precisely measuring an electrical signal that is characteristic of a device temperature (e.g., a forward bias voltage of a diode), such as without using a front-end sample-and-hold amplifier circuit, and instead using an analog-to-digital converter (ADC) circuit having an input that is configured to accommodate a full range of expected or possible characteristic input signals and provide high resolution digital output signals.

The present disclosure can help provide a solution to these problems, such as by using multiple on-die and off-die temperature sensing circuits coupled to a common encoder circuit. The encoder circuit can include an offset voltage generator circuit configured to measure and provide analog offset signals corresponding to respective on-die and off-die temperature sensing circuits.

The encoder circuit can include a digital-to-analog converter (DAC) feedback circuit that can be configured to provide one or more analog offset signals. An offset signal can be subtracted from one or more measured temperature-indicating signals of interest (e.g., received from the on-die or off-die circuits), such as before converting the signal of interest from an analog to digital signal, thereby efficiently using an available resolution of the encoder circuit. The DAC circuit can have a low resolution relative to the ADC circuit.

A binary search method or successive approximation technique can be used to determine or adjust an offset signal. In an example, an on-die or off-die temperature sensing circuit can be configured as an adjustable load circuit, for use in combination with the other of the on-die or off-die temperature sensing circuit, to further improve measurement accuracy.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates generally an example of a state diagram.

DETAILED DESCRIPTION

Figure 1:
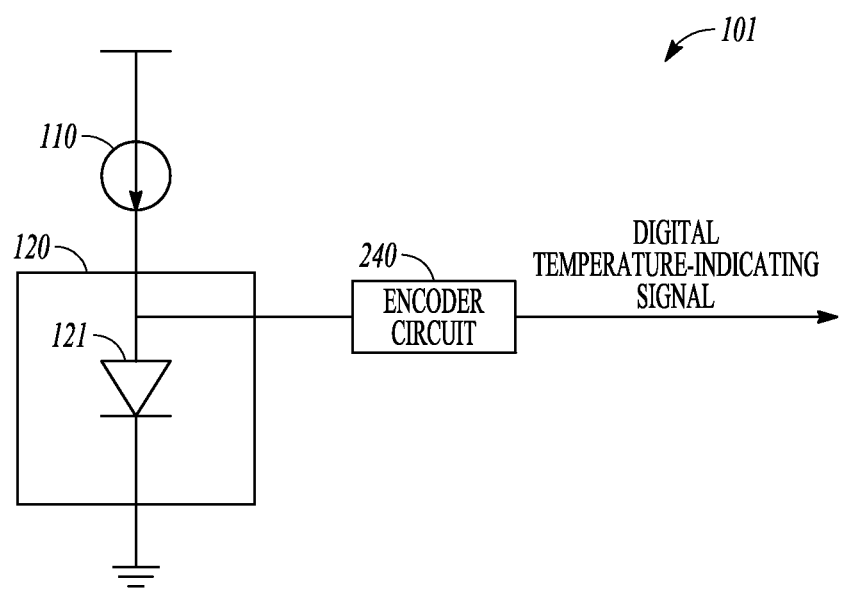
FIG. 1 illustrates generally an example of a temperature sensor system.

Information about a device temperature can be measured or determined using an electronic circuit that includes a temperature-sensitive circuit component with a semiconductor junction. Analog and digital circuits can be operated to provide or receive a temperature-indicating characteristic signal. A temperature-indicating characteristic signal can include a voltage, a current, a resistance, a transconductance, or one or more other signals characteristic of a circuit or device that include information about the circuit or device temperature.

In an example, a temperature-indicating characteristic signal from a temperature-sensitive circuit component includes a forward bias voltage, $V_{BE}$, of a diode or a similar device, such as a diode-connected transistor. The forward bias voltage can be induced in the diode in response to a first current, and temperature information about the diode can be provided by comparing the forward bias voltage to a known, or calibrated, voltage. For example, if a forward bias voltage of a particular diode junction is known to be about 600 mV at 40 C when 5 mA is applied to the diode, it can be assumed that future measurements of 600 mV at 5 mA correspond to a temperature of about 40 C. Generally, if a different bias current is used, another known or calibrated voltage can be required to provide accurate information about the diode junction temperature. For example, at 10 mA, a measurement of 600 mV can correspond to a temperature of about 60 C.

Multiple different bias currents can be successively applied to a single semiconductor junction, and the corresponding temperature-indicating characteristic signals can be monitored to provide information about the junction temperature. For example, for a semiconductor junction in a first substantially steady temperature state, a first bias current at 5 mA can induce a 600 mV characteristic signal, and a second bias current at 23 mA can induce a 640 mV characteristic signal. The difference in the characteristic forward bias voltages is proportional to temperature according to Equation (1):

$$\Delta V_{BE} = V_{BE}(I_1) - V_{BE}(I_2) = \frac{kT}{q} \cdot \ln(N) \qquad (1)$$

where k is Boltzmann's constant ($1.38 \times 10^{-23}$ JK$^{-1}$), q is the electron charge ($1.602 \times 10^{-19}$ C), N is the ratio between the bias currents $I_1$ and $I_2$, and T is the absolute temperature. In the previous example, N=4.6, $\Delta V_{BE}$=40 mV, and T=31.13 C. In a second substantially steady temperature state, the first bias current $I_1$ at 5 mA can induce a 500 mV characteristic signal, and the second bias current $I_2$ at 23 mA can induce a 542 mV characteristic signal. In this example, N=4.6, $\Delta V_{BE}$=42 mV, and T=46.34 C.

Multiple bias voltage signals (i.e., temperature-indicating characteristic signals) can be concurrently or sequentially received using multiple currents and respective multiple devices, such as devices on the same substrate or die. When bias voltage signals are concurrently received from two semiconductor devices in response to different respective bias currents, $\Delta V_{BE}$ can be measured directly. In some examples, multiple different bias current signals can be provided to respective semiconductor junctions, and the resulting responsive bias voltage signals can be measured and used to provide temperature information. One or more of the bias voltage signals can be received or used by a downstream circuit or device, such as a processor circuit or a digitizing encoder circuit.

FIG. 1 illustrates generally an example of a first temperature sensor system 101 that includes a current source 110, a first temperature sensing circuit 120, and an encoder circuit 240, such as a digitizing encoder. The temperature sensor system 101 provides a digital temperature-indicating signal based on a temperature-indicating characteristic signal from the first temperature sensing circuit 120.

In the example of FIG. 1, the first temperature sensing circuit 120 can include a first diode 121. That is, the first temperature sensing circuit 120 can include a device with a semiconductor junction, and a characteristic signal measured from the device can provide information about the temperature at the semiconductor junction (see, e.g., Equation (1)). Throughout this document, a diode, or diode-connected bipolar junction transistor (BJT), is frequently used as a non-limiting example of a temperature-sensitive circuit component with an operating characteristic that is a function of the component temperature. However, other devices or components can also be used.

The current source 110 can be coupled to the first diode 121. In response to a current signal from the current source 110, the first diode 121 can provide a bias voltage, for example at the anode of the first diode 121. The encoder circuit 240 can receive analog information about the bias voltage (e.g., voltage magnitude information about the bias voltage), and the encoder circuit 240 can convert the analog bias voltage information into a digital signal, such as a digital temperature-indicating signal. As described above, multiple different currents can be provided to the first diode 121, and the responsive multiple bias voltage signals can be used to provide information about the first diode 121 temperature.

In an example, the first temperature sensing circuit 120 and the encoder circuit 240 can be provided on a single die or wafer, or can be otherwise mechanically coupled. In an example, the first temperature sensing circuit 120 and the encoder circuit 240 are remotely located from each other and are communicatively coupled by a transmission line that is configured to transmit an analog temperature-indicating characteristic signal from the first temperature sensing circuit 120 to the encoder circuit 240, such as via an intermediate processor circuit or filter circuit. The encoder circuit 240 can be a portion of a processor circuit or other circuit, and the first temperature sensing circuit 120 can be an external circuit. In an example, the first temperature sensing circuit 120 is located remotely from the current source 110 and the encoder circuit 240.

The encoder circuit 240 can include an analog-to-digital converter (ADC) circuit. An ADC circuit can include, among others, a flash ADC circuit, a successive-approximation register (SAR) ADC circuit, a sub-ranging or two-step ADC, a sigma-delta (ΣΔ) ADC circuit, a dual slope converter, or a successive approximation converter. The encoder circuit 240 can be configured to receive an analog signal, such as an analog temperature-indicating characteristic signal, and provide a corresponding digital signal that includes information about the received analog signal.

In an example, an ADC circuit can have a sufficient input signal range to measure a full range of a semiconductor operating characteristic change over a range of temperatures. For example, if a semiconductor junction voltage can fluctuate between about 0 and 1 volt, then the ADC can be configured to have a 1 volt peak range. Such a full range ADC can be expected to provide sufficient resolution, linearity over temperature, and stability over temperature to provide accurate information about the measured diode voltage.

To improve signal resolution of analog-to-digital signal conversion by an ADC, a semiconductor characteristic (e.g., a diode voltage) can be differentially sensed. A digital-to-analog converter (DAC) circuit can be used to provide an offset signal, such as can be subtracted from the full range input signal, thereby reducing an input range or "headroom" requirement of the ADC circuit. Using the DAC circuit, one or more other circuit elements, such as a front-end sample-and-hold amplifier, can be simplified or eliminated to reduce a system or circuit size.

When measuring a semiconductor characteristic signal (e.g., a forward voltage across a diode) using an ADC circuit input, a DAC circuit output signal can be combined with the semiconductor characteristic signal at the ADC circuit input. In an example, a DAC circuit output signal can provide an offset signal based on a specified baseline. For example, the DAC circuit output signal can approximate a baseline diode voltage drop, such as corresponding to a voltage drop when a specified reference current is applied to the diode at a specified temperature (e.g., at or near a middle or lower end of an expected temperature range of the device). For subsequent measurements using the same test current, the ADC circuit input can sense a change in the semiconductor characteristic signal (e.g., voltage signal) based on a difference between the test semiconductor characteristic signal and the baseline characteristic signal at the specified temperature. An ADC circuit input range can be scaled using the DAC circuit output signal to accommodate various measured changes in characteristic signals.

The DAC circuit output signal can be a function of a device operating characteristic as measured by the ADC circuit. That is, the DAC circuit output signal can be adjusted in coordination with a change in the device operating characteristic. Such change in a device operating characteristic can include, among other things, changes due to temperature, current, voltage, device orientation or proximity to an interfering device. In an example, the DAC circuit output signal can be updated using a successive approximation method, such as described below in the examples of FIGS. 9 and 10. The successive approximation method can be used to provide, at the DAC circuit output, a representation of the operating characteristic signal (e.g., diode voltage). In an example, the successive approximation method can include using a binary search technique that uses m+1 steps to converge, where m is the number of bits in the DAC circuit, such as the number of bits used by the DAC circuit to produce a digital word.

In an example, a temperature sensor system can include multiple temperature sensing circuits that include respective semiconductor junctions that are responsive to variations in temperature. Various temperature-indicating characteristic signals from the multiple circuits can be provided to one or more encoder circuits. Each temperature sensing circuit can have a corresponding dedicated encoder circuit, and the encoder circuits can be coupled to a centralized processor circuit. In an example, multiple temperature sensing circuits can be coupled to a central encoder circuit, such as using one or more multiplexing or switching circuits to selectively couple different temperature sensing circuits to the central encoder circuit. A system with a central encoder circuit can cost-effectively monitor multiple temperature-indicating characteristic signals, such as from multiple different locations. In an example, a central encoder circuit can be provided on the same die as one or more temperature sensing circuits, and the central encoder circuit can include one or more inputs configured to be coupled to one or more temperature sensing circuits that can be external to the die.

An impedance mismatch can occur in configurations that include an external temperature sensing circuit coupled to an encoder circuit (or other intermediate circuit component). To decrease noise coupling, a load circuit can be coupled to the external temperature sensing circuit. In an example, the load circuit can be configured to adjust an operating point of one or both of the external temperature sensing circuit and the encoder circuit. In an example, the load circuit can include at least a portion of an internal temperature sensing circuit, such as coupled to the same encoder circuit as the external temperature sensing circuit.

Figure 2A:
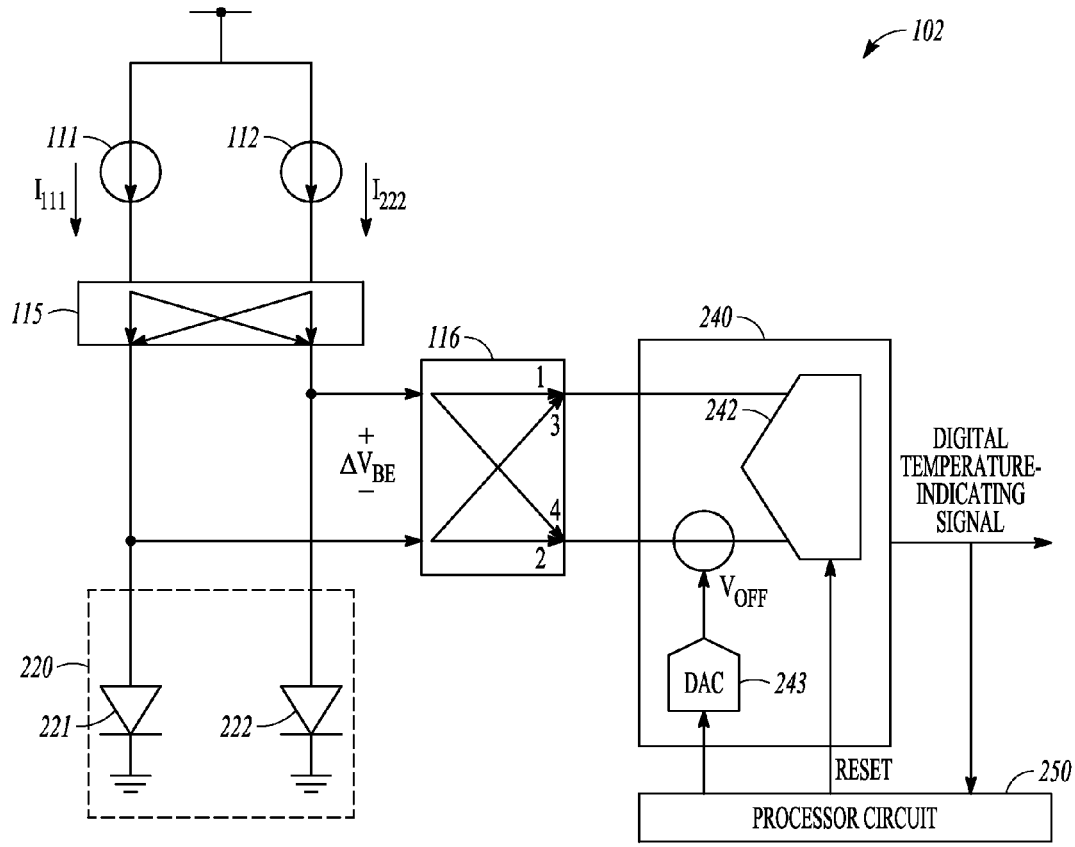
FIG. 2A illustrates generally an example of a temperature sensor system.

FIG. 2A illustrates generally an example of a second temperature sensor system 102. The second temperature sensor system 102 can be configured to use information about a voltage signal, such as a differential voltage signal, to provide a digital temperature-indicating output signal. The differential voltage signal can be provided using two or more semiconductor devices.

The second temperature sensor system 102 can include a temperature sensing circuit 220 with one or more semiconductor junctions. The temperature sensing circuit 220 can include first and second diodes 221 and 222 with respective semiconductor junctions, and the semiconductor junctions can provide respective first and second base-emitter voltages when forward biased. The first and second diodes 221 and 222 can receive first and second currents from first and second current sources 111 and 112, such as constant current sources, via a first multiplexer circuit 115. The first and second current sources 111 and 112 can be configured to provide the same or different first and second current signals $I_{111}$ and $I_{112}$, respectively. In an example, the first current signal $I_{111}$ can be selectively provided to one of the first and second diodes 221 and 222 using the first multiplexer circuit 115. In an example, the first multiplexer circuit 115 can be configured to provide a combination of the first and second current signals $I_{111}$ and $I_{112}$ to one or the other of the first and second diodes 221 and 222.

In response to the first and second current signals $I_{111}$ and $I_{112}$, a differential voltage signal $\Delta V_{BE}$ can be measured from a pair of terminals corresponding to the temperature sensing circuit 220, such as terminals at the anodes of the first and second diodes 221 and 222. The differential voltage signal can be provided to the digitizing encoder circuit 240. In an example, the digitizing encoder circuit 240 includes a sigma-delta ADC circuit 242. The sigma-delta ADC circuit 242 can have an inherent offset $V_{OFF,SD}$ that can be corrected or considered in providing an output signal, such as a digital temperature-indicating signal, from the ADC circuit 242. In an example, the differential voltage signal can be provided to the digitizing encoder circuit 240 via one or more intermediate circuits, filters, or processors, such as via a second multiplexer circuit 116.

The second temperature sensor system 102 can include a processor circuit 250. The processor circuit 250 can be configured to receive one or more digital temperature-indicating signals, such as from one or more encoder circuits. The processor circuit 250 can process, store, or transmit information about the temperature from the temperature-indicating signals. In an example, the processor circuit 250 is configured to receive a digital temperature-indicating signal and provide a feedback control signal to a power system regulation circuit, such as to prevent overheating.

The processor circuit can provide a reset signal to the encoder circuit 240. The reset signal can be received by the encoder circuit 240, and one or more components of the encoder circuit 240 can be zeroed or reset. In an example, the processor circuit 250 provides a reset signal to the second multiplexer circuit 116 to indicate that one or more of the encoder circuit 240 inputs are to be shunted, opened, or coupled to a reference signal. An example of a reset procedure is further described below in the discussion of FIGS. 2B and 3.

Figure 2B:
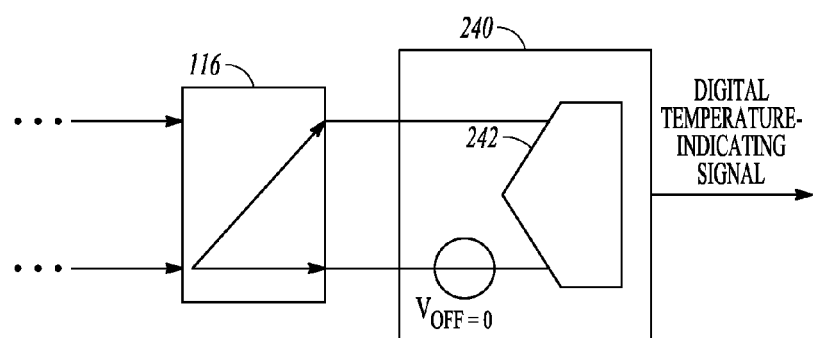
FIG. 2B illustrates generally an example of a multiplexer circuit.

FIG. 2B illustrates generally an example of the second multiplexer circuit 116 and the encoder circuit 240. The second multiplexer circuit 116 can be configured to include a reset state, such as in response to a reset signal received from the processor circuit 250. In the example of FIG. 2B, the encoder circuit 240 inputs are shunted together by the second multiplexer circuit 116 in a reset state. In an example, an adjustable-duration reset phase can be provided (e.g., about 100 µs). During an initial portion of the reset phase (e.g., about 90 µs), an integrator (or one or more other components) in the encoder circuit 240 can be reset. In the remaining portion of the reset phase (e.g., about 10 µs), the integrator (or the one or more other components) can be released while the encoder circuit 240 inputs remain shunted, for example, to allow an inherent offset of the encoder circuit 240 to settle, such as before an offset sensing procedure begins.

The second multiplexer circuit 116 can be configured to include a temperature sensing state, such as in response to a sense signal received from the processor circuit 250. In the temperature sensing state, the second multiplexer circuit 116 can couple the encoder circuit 240 inputs to the temperature sensing circuit 220. The second multiplexer circuit 116 can be configured to include one or more other states, such as to selectively couple the encoder circuit 240 inputs to the first multiplexer circuit 115, to the temperature sensing circuit 220, or to one or more other components.

Referring again to FIG. 2A, the second temperature sensor system 102 can be configured to provide the digital temperature-indicating signal using a multiple-currents method (e.g., a four-currents method). In this example, a first differential voltage signal measurement $\Delta V_{BE,21}$ can be received by the sigma-delta ADC circuit 242 in response to a first current signal $I_{111}=I$ provided to the first diode 221 and in response to a second current signal $I_{112}=NI$ provided to the second diode 222, where N is a factor by which the base current I is multiplied. A second differential voltage signal measurement $\Delta V_{BE,43}$ can be received by the sigma-delta ADC circuit 242 in response to a third current signal $I_{111}=2I$ provided to the first diode 221, and in response to a second current signal $I_{112}=2NI$ provided to the second diode 222. The processor circuit 250 can be configured to receive the first and second differential voltage signal measurements and compute a scaled measurement, such as according to Equation (2):

$$\Delta V_{BE}=2\Delta V_{BE,21}-\Delta V_{BE,43} \quad (2)$$

By computing the scaled $\Delta V_{BE}$, resistive drop offset errors that contribute to both $\Delta V_{BE,21}$ and $\Delta V_{BE,43}$ can be removed from the final temperature-indicating signal.

In an example, the inherent offset voltage $V_{OFF,SD}$ from the sigma-delta ADC circuit 242 can be determined. The offset voltage can be determined using an internal digital-to-analog converter (DAC) circuit 243 in the encoder circuit 240 (e.g., included in the sigma-delta ADC circuit 242), such as an m-bit DAC circuit. The DAC circuit 243 can provide a negative feedback loop inside the sigma-delta ADC circuit 242, and the average DAC circuit 243 output voltage can provide an approximation of the input voltage of the sigma-delta ADC circuit 242.

The DAC circuit 243 can be coupled to one or more reference voltage signals. In the example of FIG. 2A, the DAC circuit 243 can be coupled to reference voltage signals in the range of the expected offset voltage of the sigma-delta ADC circuit 242. For example, the DAC circuit 243 can be coupled to reference voltage signals that provide ±10 mV. The encoder circuit 240 can perform a digital binary search to determine the offset voltage $V_{OFF,SD}$. In an example, the DAC circuit 243 can include a six-bit DAC circuit, and the least significant bit (LSB) of the DAC circuit 243 corresponds to about 130 µV. The binary search method is described generally below, such as in the discussion of FIGS. 9 and 10.

Figure 3:
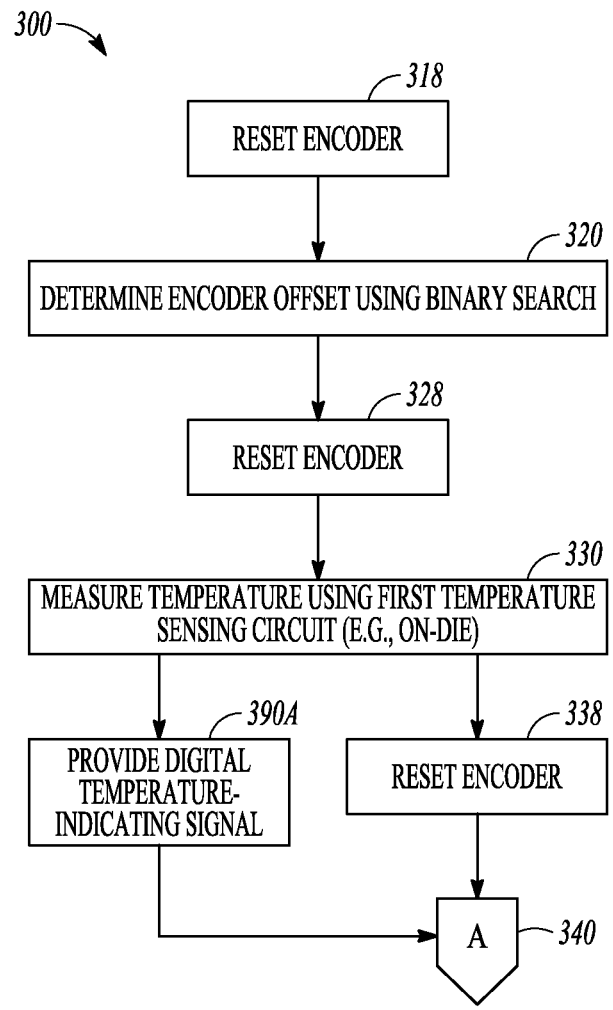
FIG. 3 illustrates generally an example of a method for providing a digital temperature-indicating signal.

FIG. 3 illustrates generally an example of a method 300 for providing a digital temperature-indicating signal. The method 300 can include using the second temperature sensor system 102 shown in the example of FIG. 2A. The method 300 can include one or more encoder reset phases, an offset identification phase, a measurement phase, and an output phase.

At 318, the method 300 includes resetting an encoder, such as the encoder circuit 240. Resetting an encoder can include zeroing or clearing an ADC circuit, such as by discharging one or more components in a sigma-delta ADC circuit. Any components capable of retaining electrical charge information can be reset, such as capacitors and parasitic capacitances on various ADC circuit nets. For example, resetting a sigma-delta ADC circuit can include shunting the inputs of an internal integrator circuit, shunting the inputs of an internal comparator circuit, decoupling an internal DAC circuit from any bias voltage, or zeroing any output filter of the ADC circuit. In an example, resetting the encoder at 318 can include shorting the input terminals of an encoder circuit, such as described above in the discussion of FIG. 2B, and optionally coupling the shorted terminals to a specified voltage. Following the resetting or zeroing procedure, the components of an ADC circuit can be released from the reset state to settle.

At 320, the encoder offset can be determined, such as using a binary search technique. The inputs of the encoder circuit can be shunted and optionally coupled to a voltage source. For example, the inputs of a sigma-delta ADC circuit can be commonly coupled to an anode of a measurement diode. As described above in the discussion of FIG. 2A, the sigma-delta ADC circuit 242 can use a feedback DAC to approximate the input voltage and generate a feedback voltage that is, on average, about equal to the input voltage. The accuracy of the offset voltage, $V_{OFF,SD}$, can be a function of the number of bits available in the DAC.

At 328, the encoder can be reset again, such as according to the discussion above at 318. In an example, information about $V_{OFF,SD}$ determined at 320 can be retained in the encoder circuit, or in a downstream processor or memory circuit.

At 330, a temperature-indicating characteristic signal can be measured using a first temperature sensing circuit. In an example, the temperature-indicating characteristic signal can be a voltage, a current, a resistance, a transconductance, or one or more other signals characteristic of a circuit or device that includes information about the temperature of the first temperature sensing circuit. The first temperature sensing circuit can include any device with a temperature-sensitive semiconductor junction, or any device with a measurable characteristic that varies with temperature. For example, in FIG. 2A, the first temperature sensing circuit can include one or more diodes. A temperature-indicating characteristic signal can be received from the one or more diodes, such as according to the discussion above. In an example, a multiple-currents measurement method can be performed one or more times to determine a temperature-indicating characteristic signal. In an example that includes using two diodes and four currents, current magnitudes of I, 2I, 10I, and 20I can be shuffled multiple times (e.g., eleven times), and corresponding analog temperature-indicating characteristic signals can be provided to the encoder.

At 390A, a digital temperature-indicating signal can be provided, such as using the encoder circuit. An m-bit (e.g., 10-bit) temperature-indicating characteristic signal can be provided for each of the multiple cycles. In an example where the temperature-indicating characteristic signal includes a 10-bit signal received eleven times (e.g., using multiple different currents), the total resolution of the final temperature-indicating characteristic signal is $10+\log_2(11) = 13.46$ bits.

In an example, measuring a temperature-indicating characteristic signal at 330 can include measuring a temperature-indicating characteristic signal from a circuit or device that is coupled to the same substrate as the encoder circuit. For example, the common substrate can be a common die, IC package, wafer, or other package that physically and communicatively couples the components together.

At 338, the encoder can be reset again, such as according to the discussion above at 318. The method 300 can continue with a subsequent temperature measurement using the same or different temperature sensing circuit. In an example, the method 300 can continue at 340 (see, e.g., the method 700 of FIG. 7).

Figure 4A:
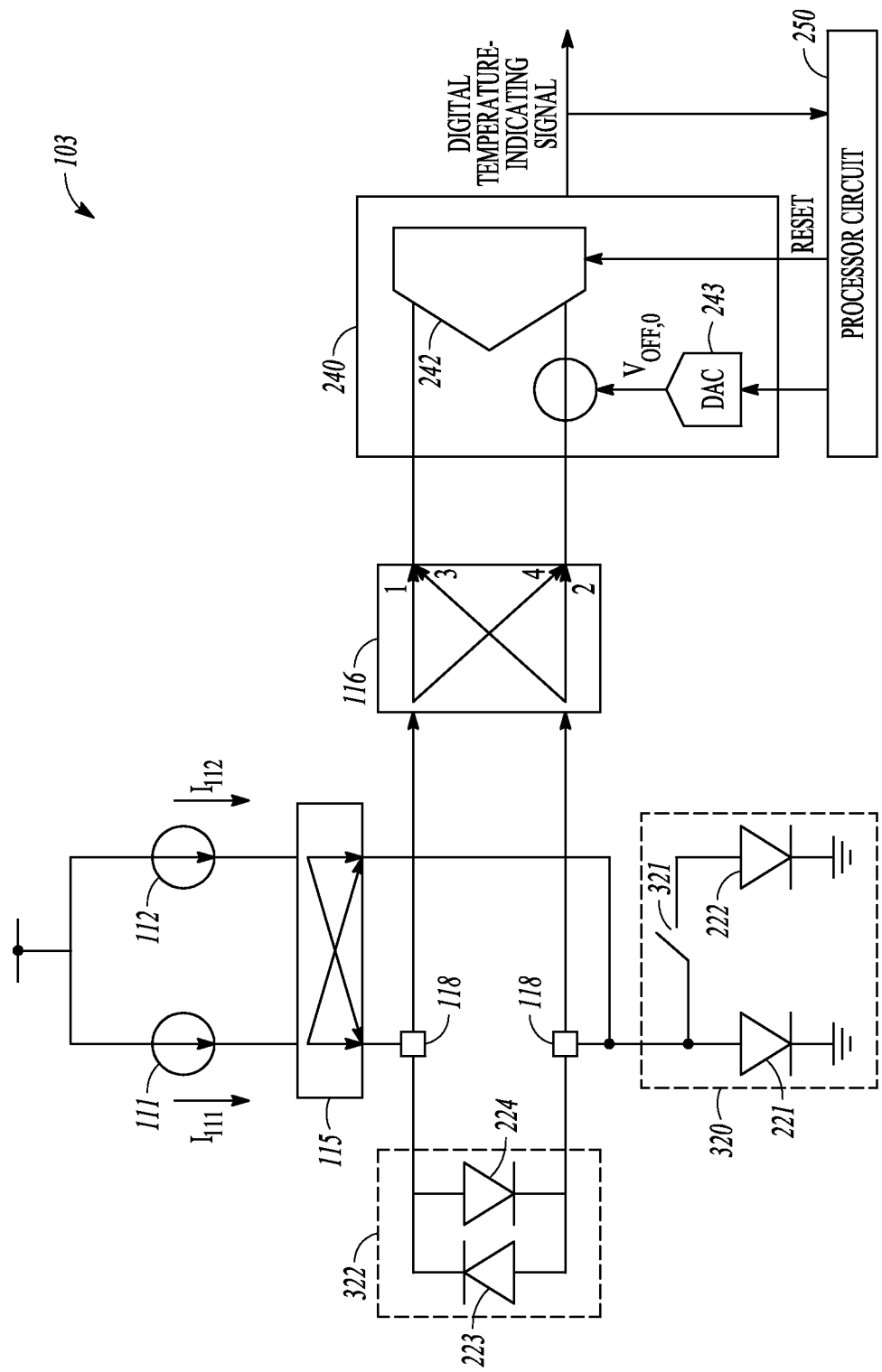
FIG. 4A illustrates generally an example of a temperature sensor system in a first configuration.

FIG. 4A illustrates generally an example of a third temperature sensor system 103. The third temperature sensor system 103 can be configured to use information about a voltage signal to provide a digital temperature-indicating output signal. In an example, the third temperature sensor system 103 is operable in first and second temperature-sensing modes to provide multiple digital temperature-indicating output signals, such as corresponding to different physical locations. A temperature-indicating voltage signal can be provided using a temperature sensing circuit, such as including one or more semiconductor devices. The voltage signal can be provided using the temperature sensing circuit in coordination with an adjustable load circuit.

The third temperature sensor system 103 can include circuit components that are similar to those discussed above in the discussion of the first and second temperature sensor systems 101 and 102. The numerals designating the similar circuit components are unchanged from the discussion of FIGS. 1, 2A, and 2B, and the discussion of these similar circuit components is incorporated in the discussion of the third temperature sensor system 103 by reference.

In an example, the third temperature sensor system 103 includes a pair of sensing nodes 118 configured to be coupled to a temperature sensing circuit. The pair of sensing nodes 118 can be configured to receive an analog signal (e.g., an analog voltage, current, or optical signal) that is indicative of a device temperature. The pair of sensing nodes 118 can be coupled to a second temperature sensing circuit 322. At least one of the pair of sensing nodes 118 can be coupled to an adjustable load circuit 320. The pair of sensing nodes 118 can be coupled to the encoder circuit 240, such as via the second multiplexer circuit 116.

The second temperature sensing circuit 322 can include one or more devices with temperature-sensitive operating characteristics. For example, the second temperature sensing circuit 322 can include semiconductor devices, such as diodes or transistors. In the example of FIG. 4A, the second temperature sensing circuit 322 includes third and fourth diodes 223 and 224 arranged in an anti-parallel configuration. The third temperature sensor system 103 can be configured such that current signals can flow through one or the other of the third and fourth diodes 223 and 224 to induce respective temperature-indicating characteristic signals.

FIG. 4A shows the third temperature sensor system 103 in a first current flow configuration. In the first current flow configuration, a current, such as provided using one or both of the first and second current sources 111 and 112, among other sources, can flow in a first direction through the second temperature sensing circuit 322 to forward bias the third diode 223.

Figure 4B:
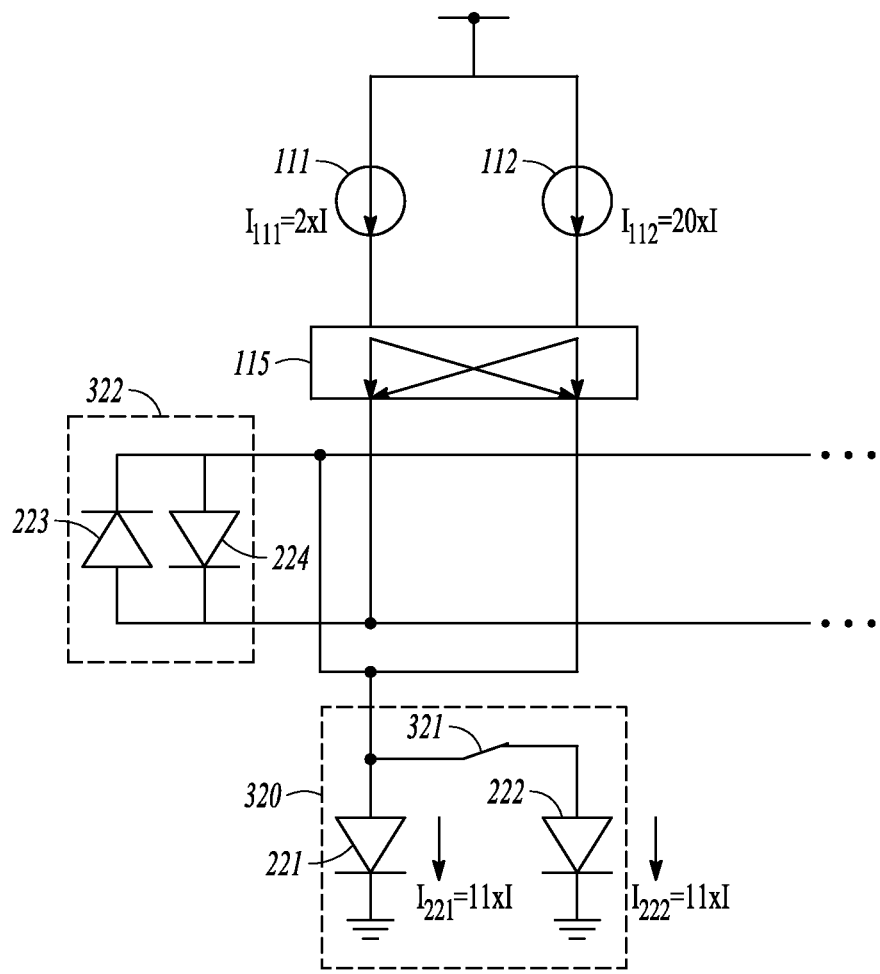
FIG. 4B illustrates generally an example of a portion of the temperature sensor system of FIG. 4A.

FIG. 4B shows a portion of the third temperature sensor system 103 in a second current flow configuration. In the second current flow configuration, a current, such as provided using one or both of the first and second current sources 111 and 112, among other sources, can flow in a different second direction through the second temperature sensing circuit to forward bias the fourth diode 224. The third temperature sensor system 103 can be selectively configured for the first or second current flow configuration using a third multiplexer circuit (not shown). The third multiplexer circuit can selectively couple one or more outputs of the first multiplexer circuit 115 with the pair of sensing nodes 118, and the third multiplexer circuit can selectively couple the pair of sensing nodes 118 with one or more inputs of the adjustable load circuit 320.

Referring again to FIG. 4A, information about a diode temperature can be provided using a temperature-indicating characteristic signal from one or both of the third and fourth diodes 223 and 224. The information about a diode temperature can include forward bias voltage information or current flow information, among other types of information, from one or both of the diodes.

The first and second current sources 111 and 112 can be configured to provide the same or different first and second current signals $I_{111}$ and $I_{112}$, respectively. In an example, the first current signal $I_{111}$ can be selectively provided to one of the third and fourth diodes 223 and 224 using the first multiplexer circuit 115. In an example, the first multiplexer circuit 115 can be configured to provide a combination of the first and second current signals $I_{111}$ and $I_{112}$ to one or the other of the third and fourth diodes 223 and 224. In response to the first and second current signals $I_{111}$ and $I_{112}$, a temperature-indicating voltage signal $V_{BE}$ can be received from the pair of sensing nodes 118 and provided to the encoder circuit 240.

The encoder circuit 240 can be coupled to the pair of sensing nodes 118 via the second multiplexer circuit 116. In an example, the pair of sensing nodes 118 can be configured to provide information to the sigma-delta ADC circuit 242 in the encoder circuit 240, and the sigma-delta ADC circuit 242 can be operated according to the discussion of FIGS. 2 and 3, above. In an example, the sigma-delta ADC circuit 242 can be configured to use information received from the second temperature sensing circuit 322 to generate an ADC offset voltage signal $V_{OFF,0}$.

The third temperature sensor system 103 can include an adjustable load circuit 320. The adjustable load circuit 320 can include first and second loading devices, such as diodes 221 and 222. The diodes 221 and 222 are described above in the discussion of the second temperature sensor system 102.

In a temperature-sensing first mode, the third temperature sensor system 103 can be configured to use a temperature-indicating characteristic signal from at least one of the first and second diodes 221 and 222, as described above in the discussion of FIG. 2A, to provide information about a device temperature. In a temperature-sensing second mode, the third temperature sensor system 103 can be configured to use a temperature-indicating characteristic signal from at least one of the third and fourth diodes 223 and 224 to provide information about a different device temperature. The first and second diodes 221 and 222 can be disposed in a first location, and the third and fourth diodes 223 and 224 can be disposed in one or more different locations. In this manner, temperature information about more than one location can be provided using the third temperature sensor system 103.

In the adjustable load circuit 320, the first and second diodes 221 and 222 can be selectively coupled (e.g., in parallel) using a first switch 321. The first and second diodes 221 and 222 can provide an adjustable load condition to balance output information from the second temperature sensing circuit 322.

For example, in response to a first bias current provided using at least one of the first and second current sources 111 and 112, the output impedance of the second temperature sensing circuit 322 can be matched with the input impedance of the digitizing encoder circuit 240, such as using the adjustable load circuit 320 in a first configuration. The first configuration can correspond to the first switch 321 in an open state. That is, in the first configuration, the second diode 222 can be decoupled from the first diode 221, and the second diode 222 can receive no operating current.

Figure 5A:
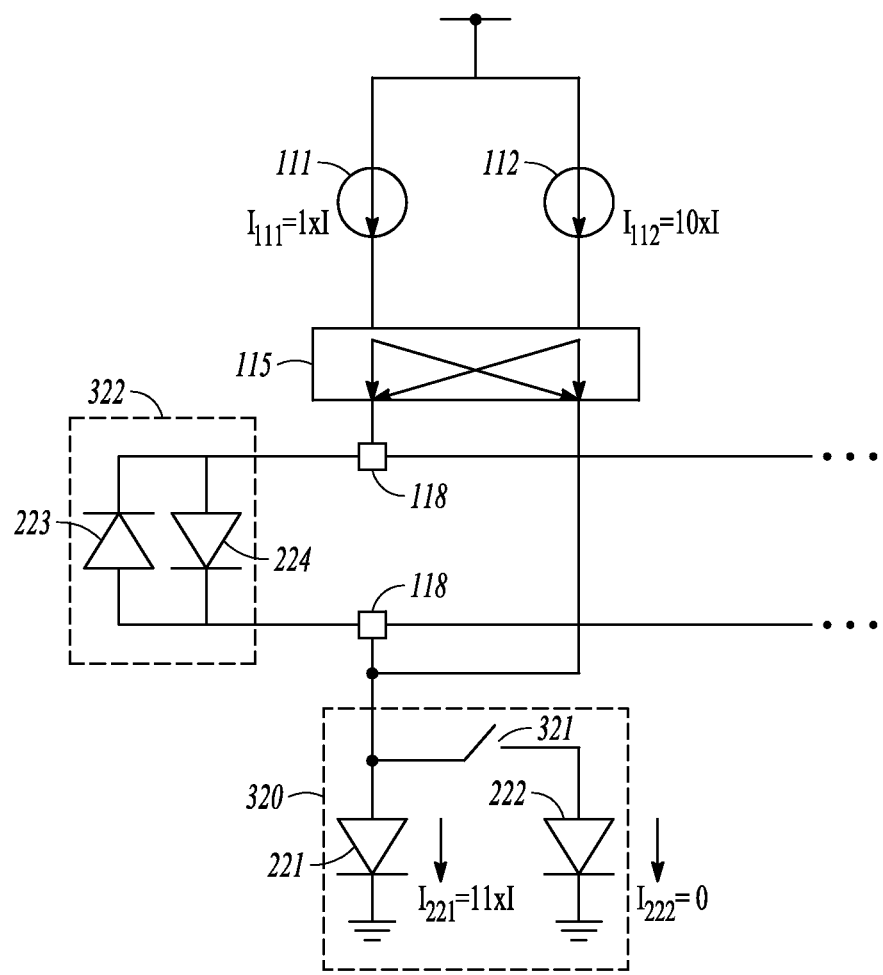
FIG. 5A illustrates generally an example of an adjustable load circuit in a first configuration.

FIG. 5A illustrates generally an example of the adjustable load circuit 320 in the first configuration. In the example of FIG. 5A, the first current source 111 can be configured to provide a first current signal $I_{111}$ having a current magnitude of I. The second current source 112 can be configured to provide a second current signal $I_{112}$ having a current magnitude of 10I (i.e., ten-times greater than I). In the first configuration, the first switch 321 can be in an open configuration, and the second diode 222 can be decoupled from the first diode 221. Accordingly, the current $I_{222}$ through the second diode 222 is zero. The current $I_{221}$ through the first diode 221 is nonzero because the first diode 221 is coupled to the second temperature sensing circuit 322 and is coupled to the second current source 112 via the first multiplexer circuit. Thus, in the first configuration, the total current provided to the first diode 221 in the adjustable load circuit 320 can be a sum of the currents provided by the first and second current sources 111 and 112, less any losses from intervening components. That is, in the first configuration, the current $I_{221}$ through the first diode 221 can be about 11I.

Figure 5B:
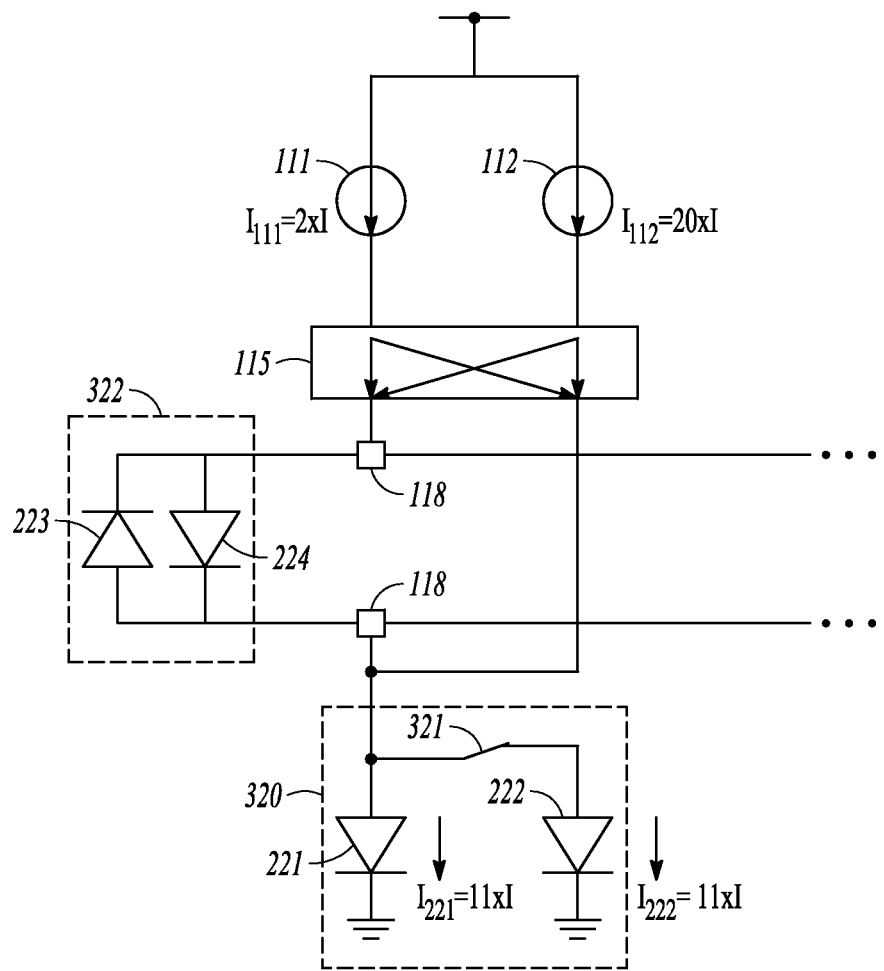
FIG. 5B illustrates generally an example of the adjustable load circuit in a second configuration.

FIG. 5B illustrates generally an example of the adjustable load circuit 320 in the second configuration. In the second configuration, the voltage at the node coupling the second temperature sensing circuit 322 to the adjustable load circuit 320 can remain substantially constant in response to a greater (e.g., doubled) second bias current.

In the example of FIG. 5B, the first current source 111 can be configured to provide a first current signal $I_{111}$ having a current magnitude of 2I. The second current source 112 can be configured to provide a second current signal $I_{112}$ having a current magnitude of 20I. In the second configuration, the first switch 321 can be in a closed configuration to couple the second diode 222 in parallel with the first diode 221. Accordingly, the currents $I_{221}$ and $I_{222}$ through the first and second diodes 221 and 222 can be nonzero. In the second configuration, the total current delivered to the adjustable load circuit 320 can be a sum of the currents provided by the first and second current sources 111 and 112, less any losses from intervening components. That is, the total current delivered to the adjustable load circuit 320 can be about 22I. The total current provided to the first and second diodes 221 and 222 can be apportioned according to the relative junction areas of the diodes. In an example where the first and second diodes 221 and 222 have substantially similar junction areas, the current $I_{221}$ through the first diode 221 can be approximately 11I, and the current $I_{222}$ through the second diode 222 can be approximately 11I.

In an example, the third temperature sensor system 103 can be configured to provide the digital temperature-indicating signal using a multiple-currents method. In this example, a first voltage signal measurement $V_{BE,1}$ can be received by the sigma-delta ADC circuit 242 in response to a first current signal $I_{111}=I$ provided to the third diode 223. A second voltage signal measurement $V_{BE,2}$ can be received by the sigma-delta ADC circuit 242 in response to a second current signal $I_{112}=NI$ provided to the third diode 223. The digital temperature-indicating signal can include information about a temperature from one or both of the first and second voltage signal measurements $V_{BE,1}$ and $V_{BE,2}$.

The multiple-currents temperature measurement method can include identifying or using an offset voltage $V_{OFF,0}$. The offset voltage can be identified using the encoder circuit 240, such as using the internal DAC circuit 243 in the encoder circuit 240, such as a m-bit DAC circuit. As described above, the DAC circuit 243 can operate in a negative feedback loop, and the average DAC circuit 243 output voltage can approximate the input voltage of the sigma-delta ADC circuit 242.

The offset voltage $V_{OFF,0}$ can be determined based on a reference temperature-indicating signal received from the second temperature sensing circuit 322. The encoder circuit 240 can perform a digital binary search to determine the offset voltage $V_{OFF,0}$. In an example, the DAC circuit 243 includes a six-bit DAC circuit, and $V_{OFF,0}$ can be in the range of about 0 to 1 V. In this example, the least significant bit of the DAC can correspond to about (DAC range)/$2^6$=1V/64=15.62 mV. The offset voltage $V_{OFF,0}$ can subsequently be used together with one or more test temperature signals from the same second temperature sensing circuit 322, or with one or more signals from a different temperature sensing circuit.

The DAC circuit 243 can be configured to provide $V_{OFF,0}$ at an input of the encoder circuit 240. For example, the DAC circuit 243 output can be coupled to a comparator circuit or summing circuit. The comparator circuit or summing circuit can be configured to receive a temperature-indicating signal from the second temperature sensing circuit 322, and the comparator circuit or summing circuit can be configured to provide an indication of a sum or difference between the offset voltage $V_{OFF,0}$ and the received temperature-indicating signal from the second temperature sensing circuit 322. In an example, $V_{OFF,0}$ can be about 0 to 900 mV, such as corresponding to a forward bias voltage of one of the third and fourth diodes 223 and 224.

In an example, the multiple-currents method can include identifying the offset voltage $V_{OFF,0}$ using a reference current provided by the first current source 111, such as the current $I_{111}$, and using the adjustable load circuit 320 in a first configuration (see, e.g., FIG. 5A). The multiple-currents method can include using the offset voltage $V_{OFF,0}$ with one or more subsequent temperature-indicating characteristic signals from the second temperature sensing circuit 322, such as characteristic signals induced by one or more test currents. For example, a first temperature-indicating characteristic signal can be provided by the second temperature sensing circuit 322 in response to the current $I_{112}$. Using the first multiplexer circuit 115, the current $I_{112}$ can be provided from the second current source 112 to the second temperature sensing circuit 322, and the first current $I_{111}$ can be provided from the first current source 111 to the adjustable load circuit 320. Further temperature-indicating characteristic signals can be provided by the second temperature sensing circuit 322 in response to other currents provided by the first and second current sources 111 and 112.

FIG. 6 illustrates generally an example of a state diagram for some of the components of the third temperature sensor system 103. The state diagram indicates examples of a multiple-currents method for providing temperature information, such as using information about a differential bias voltage $\Delta V_{BE}$ (e.g., a differential voltage signal received from the first and second diodes 221 and 222), or using information about a voltage $V_{118}$ at the pair of sensing nodes 118, such as received from, or characteristic of, the third or fourth diode 223 or 224.

In the columns headed "$I_{111}$" and "$I_{112}$", the state diagram includes information about current signal values provided by the first and second current sources 111 and 112, respectively. In row 1, $I_{111}$ has a value of "1×", or one times a base current signal level I. $I_{112}$ has a value of "10×", or ten times the base current signal level I. In an example, current signal level I corresponds to 50 mA. Accordingly, $I_{111}$ corresponds to a current signal level of 50 mA, and $I_{112}$ corresponds to a current signal level of 500 mA.

The column headed "MUX 115" includes routing information about the first and second current sources 111 and 112, such as using the first multiplexer circuit 115. This column indicates which, if any, of the first and second current sources 111 and 112 is coupled to one or more of the first, second, third, and fourth diodes 221, 222, 223, and 224. For example, in row 1, "$I_{111}$-$D_{221}$" indicates that the current $I_{111}$ from the first current source 111 is coupled to the first diode 221, such as via the first multiplexer circuit 115. In row 1 of the state diagram, "$I_{112}$-$D_{222}$" indicates that the current $I_{112}$ from the second current source 112 is coupled to the second diode 222 via the first multiplexer circuit 115.

The column headed "$S_{321}$" includes information about a state of the first switch 321, such as information about whether the switch is open (open circuit) or closed (shunted). The columns headed "$I_{221}$", "$I_{222}$", "$I_{223}$", and "$I_{224}$" include information about currents received by the first, second, third, and fourth diodes 221, 222, 223, and 224, respectively. For example, in row 1, the first and second diodes 221 and 222 receive currents of magnitudes "1×" and "10×", respectively. In this example configuration, the third and fourth diodes 223 and 224 do not receive any current because they can be decoupled from the sensor system.

The columns headed "$\Delta V_{BE}$" and "$V_{118}$" indicate whether the information received by an encoder circuit (e.g., the encoder circuit 240) is a differential voltage signal $\Delta V_{BE}$ or another type of voltage signal, such as a voltage signal $V_{118}$ received from the pair of sensing nodes 118. The column headed "MUX 116" includes routing information about the second multiplexer circuit 116. This column indicates the signal path between the encoder circuit 240 inputs and the pair of sensing nodes 118.

Row 0 of the state diagram in the example of FIG. 6 is labeled "ADC Offset Calibration". This row corresponds to a calibration configuration, such as described above in the discussion of FIG. 3 at 318.

Rows 1 through 4 of the state diagram in the example of FIG. 6 are labeled "Internal". These rows can correspond to multiple configurations of the second temperature sensor system 102 (or to multiple configurations of the third temperature sensor system 103, such as when the third temperature sensor system 103 is configured to use the first and second diodes 221 and 222 to provide temperature information), such as can be configured to provide temperature information using one or more temperature-indicating characteristic signals from the temperature sensing circuit 220.

Rows 5 through 12 of the state diagram in the example of FIG. 6 are labeled "External". These rows can correspond to multiple configurations of the third temperature sensor system 103, such as can be configured to provide temperature information using one or more temperature indicating characteristic signals from the second temperature sensing circuit 322.

In an example, the third temperature sensor system 103 is selectively operable in both first and second temperature-sensing modes. The first mode can correspond to an "internal" sensor that can provide temperature information using temperature-indicating characteristic signals from the first and second diodes 221 and 222. The first mode can be considered to be "internal" because the first and second diodes 221 and 222 can be coupled to the encoder circuit 240, such as on the same integrated circuit. The second mode can correspond to an "external" sensor that can provide temperature information using temperature-indicating characteristic signals from one or both of the third and fourth diodes 223 and 224. In the second mode, the third and fourth diodes 223 and 224 can be disposed remotely from each other, such as to provide temperature-indicating characteristic signals from different sensor locations. In this manner, the third temperature sensor system 103 can provide temperature information about three or more different locations, including a first location corresponding to the first and second diodes 221 and 222, a second location corresponding to the third diode 223, and a third location corresponding to the fourth diode 224.

Figure 7:
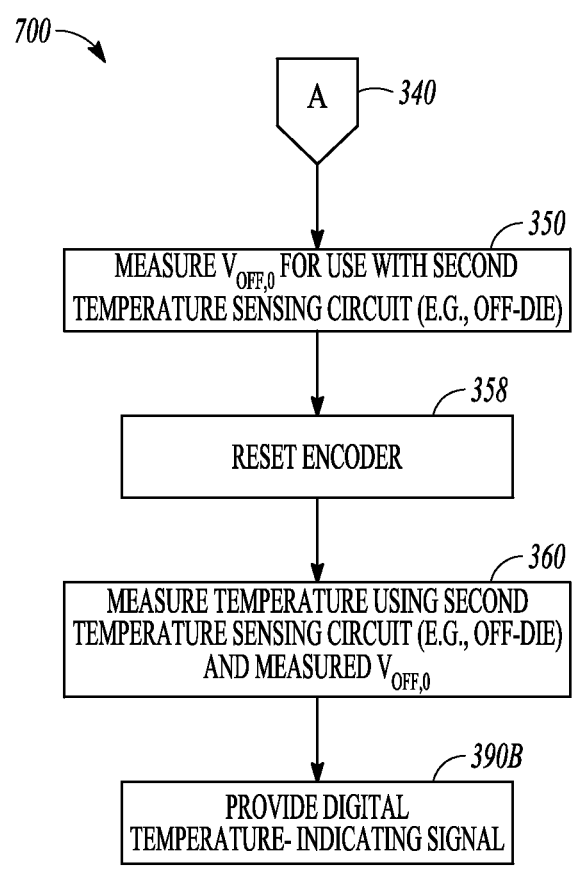
FIG. 7 illustrates generally an example of a method for providing a digital temperature-indicating signal.

FIG. 7 illustrates generally an example of a method 700 for providing a digital temperature-indicating signal, such as using the third temperature sensor system 103. The method 700 can include at least one encoder reset phase, an offset identification phase, a measurement phase, and an output phase. In an example, the method 700 can begin at 340, such as after providing a digital temperature-indicating signal at 390A, or after resetting an encoder at 338, in the example of the method 300 illustrated in FIG. 3.

At 350, an encoder offset can be measured or determined, such as using a binary search technique. The encoder offset can be a voltage offset signal $V_{OFF,0}$. As described above, the encoder circuit 240 can use the feedback DAC 243 to approximate an input voltage and generate a feedback voltage that is, on average, about equal to the input voltage. The accuracy of the offset voltage, $V_{OFF,0}$, can be a function of the number of bits available in the feedback DAC 243.

At 350, measuring $V_{OFF,0}$ can include measuring a semiconductor junction voltage in response to a reference bias current provided to the semiconductor junction. Referring to the state diagram of FIG. 6, row 5 corresponds to a reference configuration of the third temperature sensor system 103. In the reference configuration, a reference current of "1x" can be provided to the third diode 223. In response, the encoder circuit 240 can measure the voltage across the diode at the pair of sensing nodes 118. The encoder circuit 240, such as in combination with a feedback DAC, can approximate the voltage across the diode in response to the reference current, and provide the offset voltage $V_{OFF,0}$.

At 358, all or a portion of the encoder can be reset, such as described above in the discussion of FIG. 3 at 318. In an example, the feedback DAC 243 can be configured to retain information about the offset voltage $V_{OFF,0}$, while one or more other portions of the encoder circuit 240 can be reset or zeroed. For example, information about the offset voltage $V_{OFF,0}$ can be retained in a memory circuit for subsequent retrieval, while integrator circuit and comparator circuit components of the encoder circuit 240 are cleared.

At 360, a temperature-indicating characteristic signal can be measured using a second temperature sensing circuit. The second temperature sensing circuit can include a device with a temperature-sensitive semiconductor junction, or any device with a measurable characteristic that varies with temperature. For example, in FIG. 4A, the second temperature sensing circuit can include the third or fourth diode 223 or 224. In an example, the temperature-indicating characteristic signal can be a voltage, a current, a resistance, a transconductance, or one or more other signals characteristic of a circuit or device that includes information about the temperature of the first temperature sensing circuit. In an example, the temperature-indicating characteristic signal can be received from the same or different circuit or device as used at 350 to provide the offset voltage $V_{OFF,0}$.

At 360, measuring the temperature using the second temperature sensing circuit can include using information about a semiconductor junction biased using one or more stimulation signals. For example, the state diagram of FIG. 6, at rows 6, 7, and 8, illustrates generally examples of using the third diode 223 to provide a temperature-indicating characteristic signal from which a temperature can be measured. At row 6, a current signal $I_{112}$ (e.g., having a 10× magnitude) can be provided to the third diode 223. In response, a voltage signal $V_{118}$ across the anode and cathode of the third diode 223 can be measured.

A combination of the offset voltage $V_{OFF,0}$ and the voltage signal $V_{118}$ can be made available at an input terminal of the encoder circuit 240. The offset voltage $V_{OFF,0}$ can be subtracted from the voltage signal $V_{118}$, and the difference can be provided to the encoder circuit 240. In an example, $V_{OFF,0}$ can be 600 mV, and $V_{118}$ can be 620 mV, and the combination of the signals can thus be 20 mV. The encoder circuit 240 can be configured to receive voltage signals in a particular range, such as corresponding to the range of expected difference signals.

In some circuits, the input range of an encoder circuit can be based on an expected operating range of a device, such as a semiconductor device. That is, when an encoder circuit is coupled to a diode, for example, the encoder circuit can be configured to receive voltage signals in the range of about 0 to 900 mV corresponding to a forward bias voltage of the diode. In contrast, an input range of another encoder circuit can be based on an expected differential operating range of one or more devices. For example, an input of the encoder circuit 240 can be configured to receive voltage signals in the range of about 0 to 100 mV, such as corresponding to a differential signal between two or more bias voltages.

In the state diagram of FIG. 6 at row 7, a current signal $I_{111}$ (e.g., having a 2× magnitude) can be provided to the third diode 223. In response, a voltage signal $V_{118}$ across the third diode 223 can be measured. The voltage signal $V_{118}$ can be combined with $V_{OFF,0}$ at or before an input to the encoder circuit 240. The combination can be received by the encoder circuit 240 and used to provide temperature information. In an example, information about the voltage signals $V_{118}$ corresponding to rows 5, 6, and 7 can be used, such as by the processor circuit 250, to provide temperature information. Multiple response signals, based on multiple different bias signals, can be used to provide information about device temperature (see, e.g., Equation (1)).

Multiple different signals can be used as bias signals to establish a reference voltage, such as the offset voltage $V_{OFF,0}$. In an example, the offset voltage $V_{OFF,0}$ can be provided based on a lowest expected operating current. By using the lowest expected operating current for the reference, test information about the subsequent differential voltage measurements can be expected to have a higher signal magnitude than the reference. Accordingly, the comparator circuit or summing circuit used at the input of the encoder circuit 240 can be configured to operate in the same manner for each subsequent signal. Test signals can be expected to exceed a reference signal, and a summing circuit can be configured to invert the reference signal before summing the reference signal with the test signal, to ensure that the resulting signal has a non-negative value.

Referring again to FIG. 7, at 390B, a digital temperature-indicating signal can be provided. The digital temperature-indicating signal can be provided using the encoder circuit 240, the processor circuit 250, or one or more other devices or components in an output stage of the third temperature sensor system 103.

In an example, an m-bit (e.g., 10-bit) temperature-indicating signal can be provided at 390B, such as for each of multiple cycles, such as eleven cycles. Each cycle can correspond to measuring temperature information (e.g., at 360 in the example of FIG. 7) and providing a digital temperature-indicating signal at 390B using different bias signals, or using some or all of the same bias signals. For example, referring to FIG. 7 at 360 and FIG. 6 at rows 6, 7, and 8, digital temperature-indicating signals can be provided that correspond to each measurement of $V_{118}$. These same bias conditions or others can be repeated multiple times, such as to validate test results and the corresponding temperature information. Different bias conditions can be used to further validate the temperature information.

In an example, the number of cycles to be used can be based on a ratio between bias current signals. Referring again to Equation (1), N represents a ratio between bias currents $I_1$ and $I_2$, such as corresponding to the first and second current sources 111 and 112. The number of cycles can be N+1. Each time a bias current changes, a new m-bit (e.g., 10-bit) temperature-indicating signal can be provided (e.g., at 390B in FIG. 7). In an example where m is 10, each row of FIG. 6 can correspond to eleven acquisition cycles, and a total resolution of a temperature-indicating characteristic signal at a particular bias level can be 13.46 bits, as described above in the discussion of FIG. 3 at 390A.

Figure 8:
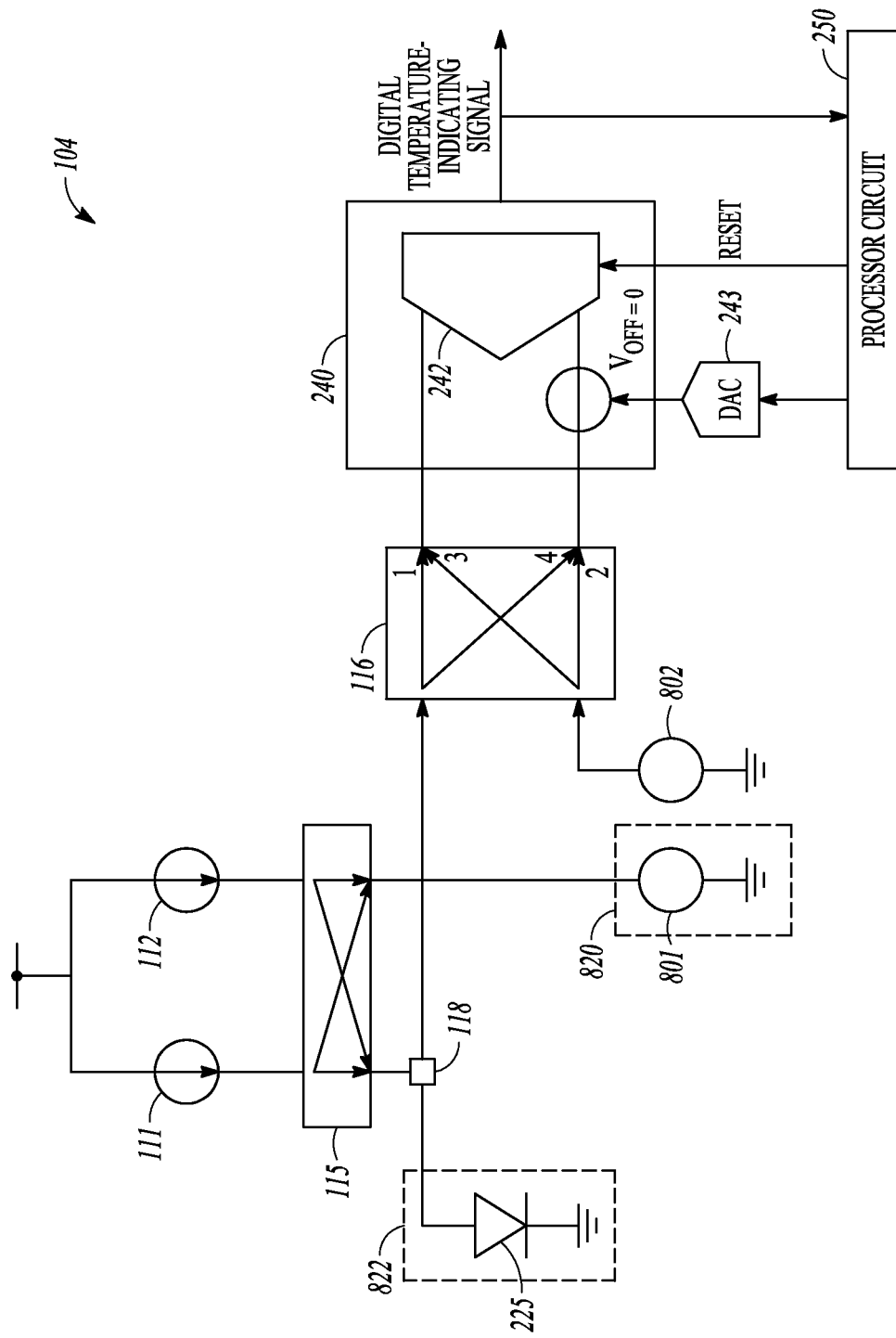
FIG. 8 illustrates generally an example of a temperature sensor system.

FIG. 8 illustrates generally an example of a single-ended temperature sensor system 104. The single-ended temperature sensor system 104 includes several circuit components that are similar to those discussed above with respect to FIGS. 2A, 2B, 4A, and 4B. The numerals designating the similar circuit components are unchanged from the discussion above, and the discussion of these similar circuit components is incorporated in the following discussion of the single-ended temperature sensor system 104 by reference.

The single-ended temperature sensor system 104 can include a remote temperature sensing circuit 822, and the remote temperature sensing circuit 822 can include one or more semiconductor devices, such as including a fifth diode 225. The remote temperature sensing circuit 822 and the fifth diode 225 can be coupled to the first and second current sources 111 and 112, such as via the first multiplexer circuit 115. The remote temperature sensing circuit 822 can include a single temperature-sensing component, such as can be located remotely from the encoder circuit 240. In an example, a single node can be coupled from the remote temperature sensing circuit 822 to the encoder circuit 240 when the temperature sensing circuit 822 locally grounded (i.e., remotely grounded from the encoder circuit 240).

In the example of FIG. 8, a first sink/source 801 can be provided. The first sink/source 801 can be coupled to the first and second current sources 111 and 112, such as via the first multiplexer circuit, such as to provide a current path for one or more currents from the current sources and to enable the single-ended temperature sensor system 104 to operate according to the multiple-currents methods described above.

A second sink/source 802 can be provided. The second sink/source 802 can be configured to provide a level shift or impedance adjustment. The signal from the second sink/source 802 can be selected such that the signal is less than a lowest-expected temperature-indicating characteristic signal from the remote temperature sensing circuit 822. The signal from the second sink/source 802 can be selected such that the signal is sufficiently large enough to ensure that a negative input buffer of the encoder circuit 240 is biased.

The remainder of the single-ended temperature sensor system 104 can be operable in the same or similar manner as described above with respect to the third temperature sensor system 103. For example, the single-ended temperature sensor system 104 can be configured to determine an offset voltage using the encoder circuit 240 and the feedback DAC 243, and one or more digital temperature-indicating signals can be provided by the encoder circuit 240 based on the offset voltage and one or more subsequent voltage signals from the remote temperature sensing circuit 822.

Figure 9:
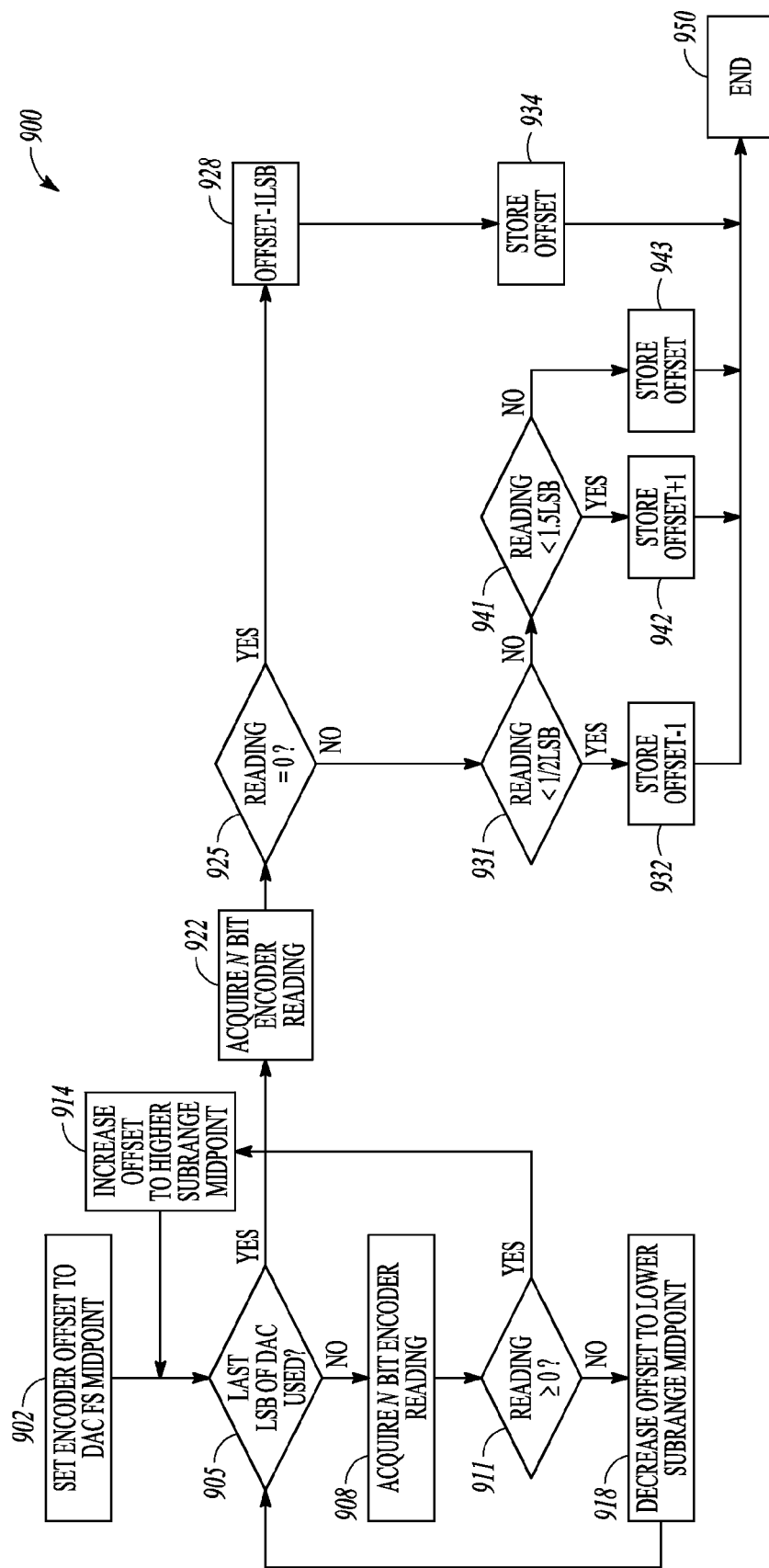
FIG. 9 illustrates generally an example of a method for providing an offset signal.
Figure 10:
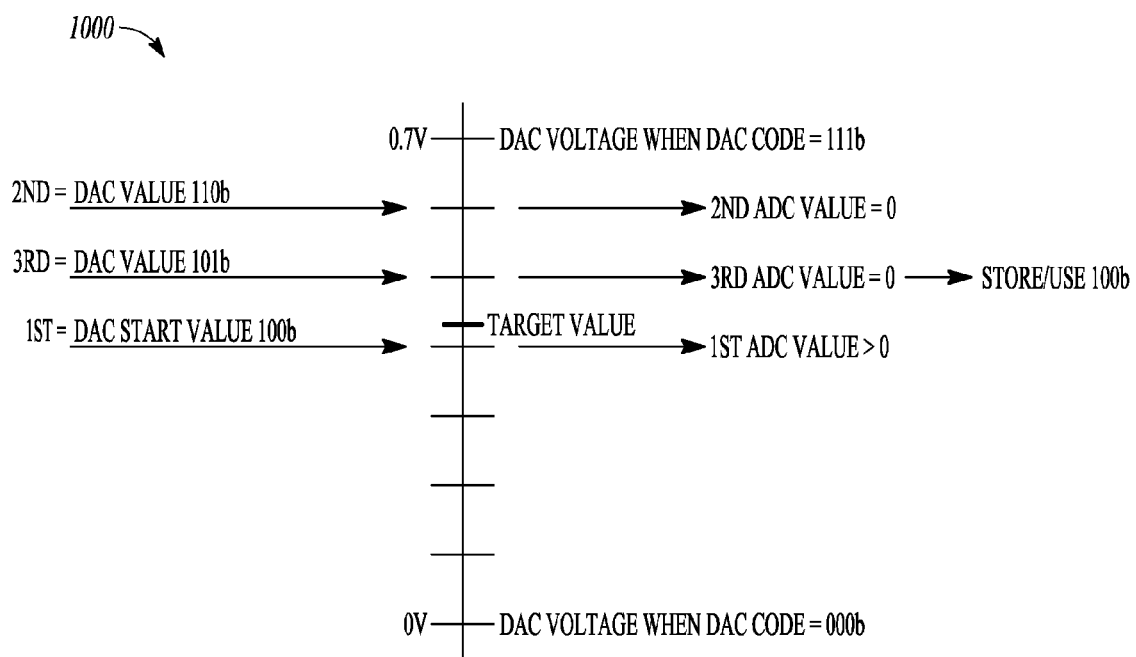
FIG. 10 illustrates generally an example of a method for providing an offset signal.

FIG. 9 illustrates generally an example of a method 900 for providing an offset signal using successive approximation of a reference signal. In an example, one or both of the offset voltage signals $V_{OFF,SD}$ and $V_{OFF,0}$ can be provided according to the method 900. FIG. 10 illustrates generally an example 1000 that can include applying the method 900 to identify an offset signal using a three-bit DAC circuit.

In the example of FIG. 9, the method 900 is described using several elements from FIG. 4A. At 902, the offset signal $V_{OFF,0}$ can be set, using the feedback DAC 243, to one-half of the full-scale output of the feedback DAC 243. For example, where the feedback DAC 243 can provide between about 0 and 1 V, at 902, the offset signal $V_{OFF,0}$ can be set to 500 mV. In an example, the feedback DAC 243 is a six-bit DAC circuit, and one-half of the full-scale output of the feedback DAC 243 corresponds to a DAC digital signal of 100000b. When a DAC circuit having two or more bits is set to one-half of the full-scale output, then the most significant bit, or leading bit, is "1" and the least significant bit (LSB) is "0."

At 905, the LSB of the DAC digital signal can be analyzed (e.g., by a processor circuit) to determine whether the LSB is a 1 or a 0. If the LSB of the DAC is 0, then, at 908, the encoder circuit 240 can acquire a reading of an analog signal at the encoder circuit 240 input terminals. That is, the encoder circuit 240 can acquire an analog signal at the input terminals and provide, in response and at the output of the encoder circuit 240, an N bit digital word. The digital word can include temperature information from one or more of the temperature sensor circuits described above.

At 911, the reading acquired at 908 can be compared to a threshold value. For example, at 911, whether the reading acquired at 908 is greater than or equal to zero can be determined. If the reading acquired at 908 is greater than or equal to zero, then the offset signal $V_{OFF,0}$ can be less than the analog signal at the encoder circuit 240 input terminals, and the method 900 can continue at 914. If the reading acquired at 908 is less than zero, then the offset signal $V_{OFF,0}$ can be greater than the analog signal at the encoder circuit 240 input terminals, and the method 900 can continue at 918.

At 914, the offset signal $V_{OFF,0}$ can be adjusted using the feedback DAC 243. For example, the offset signal $V_{OFF,0}$ can be incremented, such as by a predetermined amount. The predetermined amount can include a subsequent subrange midpoint of the DAC digital signal. For example, if the initial DAC digital signal is 100000b, then incrementing the digital signal can include incrementing the DAC digital signal to 110000b. From 914, the method 900 can continue, after incrementing the DAC digital signal, by returning to 905. In an example, the offset signal $V_{OFF,0}$ can be incremented at 914 by a variable amount, such as determined by the processor circuit 250.

At 918, the offset signal $V_{OFF,0}$ can be adjusted using the feedback DAC 243. For example, the offset signal $V_{OFF,0}$ can be decremented, such as by a predetermined amount. The predetermined amount can include a lower subrange midpoint of the DAC digital signal. For example, where the initial DAC digital signal is 100000b, decrementing the digital signal can include decrementing the DAC digital signal to 010000b. From 918, the method 900 can continue, after decrementing the DAC digital signal, by returning to 905. In an example, the offset signal $V_{OFF,0}$ can be decremented at 918 by a variable amount, such as determined by the processor circuit 250.

In an example, the successive approximation algorithm of method 900, including steps 905 through 918, can provide a DAC digital signal wherein the LSB is 1. For example, the DAC digital signal can be 100001b. Accordingly, at 905, the method 900 can continue to 922, where, similarly to the step at 908, the encoder circuit 240 can acquire a reading of an analog signal at the encoder circuit 240 input terminals. The digital reading, or encoder output, can include temperature information from one or more of the temperature sensor circuits described above, such as using a voltage offset $V_{OFF,0}$ corresponding to the DAC digital signal 100001b.

The remaining steps of the method 900, including steps 925 through 943, provide a verification algorithm, such as can be used to correct monotonicity of the feedback DAC 243. At 925, the digital reading can be compared to a threshold value. For example, at 925, whether the reading acquired at 922 is equal to zero can be determined. If the reading acquired at 922 is zero, then the offset voltage $V_{OFF,0}$ corresponding to the DAC digital signal is about the same as the analog signal at the encoder circuit 240 input terminals. At 928, the DAC digital signal can be reduced by 1 LSB, such as to ensure that subsequent measurements of the analog signal at the input terminals remain non-zero. That is, by slightly reducing the offset voltage $V_{OFF,0}$ magnitude by way of reducing the DAC digital signal, the expected input at the encoder circuit 243 can more likely be non-zero. At 934, the reduced DAC digital signal can be stored, such as for use in providing the offset voltage $V_{OFF,0}$. With the DAC digital signal thus provided, the method 900 can end at 950. If the reading acquired at 922 is nonzero, then the offset voltage $V_{OFF,0}$ corresponding to the DAC digital signal is less than the analog signal at the encoder circuit 240 input terminals. At 931 and 941, the method 900 can include a verification procedure to ensure an accurate DAC digital signal is used to provide $V_{OFF,0}$.

At 931, the reading acquired at 922 can be analyzed, such as by the processor circuit 250, to determine whether the encoder circuit 240 digital output signal is less than a specified portion of the offset voltage $V_{OFF,0}$. For example, at 931, the digital output can be compared to a first threshold offset voltage signal from the feedback DAC 243. The first threshold offset voltage signal can, in an example, correspond to a voltage signal that is about one-half of the voltage signal corresponding to the LSB of the DAC. For example, where the LSB of the DAC corresponds to a 5 mV signal, the first threshold offset voltage signal can be about 2.5 mV. In this example, the digital output from the encoder circuit 240 can be compared to 2.5 mV. If the digital output is less than the first threshold offset voltage signal, then the DAC digital signal can be reduced by 1 LSB at 932, such as to ensure that subsequent measurements of the analog signal at the input terminals remain non-zero. With the DAC digital signal thus provided at 932, the method 900 can end at 950.

If the digital output is not less than the first threshold offset voltage signal, then the digital output can be compared to a second threshold offset voltage signal from the feedback DAC 243. The second threshold offset voltage signal can, in an example, correspond to a voltage signal that is about one-and-one-half of the voltage signal corresponding to the LSB of the DAC. For example, if the LSB of the DAC corresponds to a 5 mV signal, then the second threshold offset voltage signal can be about 7.5 mV. In this example, the digital output from the encoder circuit 240 can be compared to 7.5 mV. If the digital output is greater than the second threshold offset voltage, then the DAC digital signal can be increased by 1 LSB at 942. If the digital output is less than the second threshold offset voltage signal, then the DAC digital signal can be stored at 943. With the DAC digital signal thus provided and stored at one of 942 or 943, the method 900 can end at 950.

FIG. 10 illustrates generally an example 1000 that can include providing an offset signal using successive approximation of a reference signal. The offset signal can be provided by a DAC circuit, such as the feedback DAC 243 in the example of FIG. 4A. In an example, the DAC circuit can include a 3-bit DAC circuit. A higher or lower resolution DAC circuit can be used. The 3-bit DAC circuit can receive a 3-bit digital word (e.g., from the sigma-delta ADC circuit 242) and provide a corresponding analog output signal. For example, the 3-bit DAC circuit can receive the 3-bit digital word and provide an analog output signal, such as over multiple cycles, and the analog output signal corresponds, on average, to the value indicated by the digital word.

The example 1000 is described below with reference to the method 900 of FIG. 9. However, methods other than successive approximation can be used to provide an offset signal. In the example 1000, a target value can be approximated, such as according to the method 900. The target value can represent an offset voltage, such as $V_{OFF,0}$ or $V_{OFF,SD}$, such as can be provided to compensate for an inherent offset in an encoder circuit, or that can be used as an offset signal in a differential measurement.

In the example 1000, the vertical axis corresponds to an analog output voltage signal from the 3-bit DAC circuit. The analog output voltage signal can be in the range of 0 to 0.7 V. When the 3-bit DAC circuit receives 000b as the digital word, then the DAC circuit can provide an analog output signal at or around 0 V. When the 3-bit DAC circuit receives 111b as the digital word, then the DAC circuit can provide an analog output signal at or around 0.7 V. In the example 1000, the target value can be about 0.45 V.

Referring to FIGS. 9 and 10, the method 900 can begin at 902, corresponding to setting the DAC circuit to mid-scale. The 3-bit DAC circuit in the example 1000 can receive 100b as the digital word, corresponding to an analog output signal value of about 0.4 V. At 905, the digital word 100b can be analyzed to determine whether the LSB of the digital word is high or low. The LSB is 0, and the method 900 can continue at 908 to acquire an encoder reading, such as using the analog output signal of about 0.4 V. The target value can be summed with the inverted analog output signal. Because the target value 0.45 V is greater than the analog output signal, the reading at 911 is greater than zero. At 914, the digital word 100b can be incremented to a higher subrange midpoint. For example, the digital word 100b can be incremented to 110b, such as corresponding to an analog output signal value of about 0.6 V.

At 905, the digital word 110b can be analyzed to determine whether the LSB of the digital word is high or low. The LSB is 0, and the method 900 can continue at 908 to acquire an encoder reading, such as using the updated analog output signal of about 0.6 V. Because the target value 0.45 V is less than the updated analog output signal, the reading at 911 is less than zero. At 918, the digital word 110b can be decremented to 101b, such as corresponding to an analog output signal value of about 0.5 V.

At 905, the LSB of the digital word 101b can be analyzed. The LSB is 1, and the method 900 can continue at 922 to acquire an encoder reading, such as using the updated analog output signal of about 0.5 V. In this example, the target value 0.45 V is less than the updated analog output signal by about 0.05 V. Accordingly, the method continues at 925, where the reading is analyzed. In an example, the reading can be considered to be 0 whenever the reading indicates a negative value. The method can continue at 928 to decrement the digital word 101b by 1 LSB to 100b. Accordingly, at 934, the digital word 100b can be stored and used for subsequent measurements. For example, the digital word 100b can correspond to $V_{OFF,0}$, and the DAC circuit analog output signal can correspond to 100b (e.g., 0.5 V in the example 1000).

Various Notes & Examples

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in any claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A temperature sensing system for providing temperature-indicating output signals based on temperature-indicating analog signals from on-die and off-die circuits, the temperature sensing system comprising:
    a first temperature sensing circuit, included on an integrated circuit die, the first temperature sensing circuit configured to provide a temperature-indicating first analog signal;
    a second temperature sensing circuit, located off the integrated circuit die, the second temperature sensing circuit configured to provide a temperature-indicating second analog signal; and
    a digitizing encoder circuit, included on the same integrated circuit die as the first temperature sensing circuit, the digitizing encoder circuit coupled to the first temperature sensing circuit and to the second temperature sensing circuit, the digitizing encoder circuit configured to encode the first analog signal or the second analog signal into a temperature-indicating digital signal, and wherein the digitizing encoder circuit includes a feedback path with a digital-to-analog converter (DAC) circuit configured to provide an analog offset voltage signal at an input of the digitizing encoder circuit, wherein the offset voltage signal is based on one of the first analog signal from the first temperature sensing circuit and the second analog signal from the second temperature sensing circuit.

2. The temperature sensing system of claim 1, wherein the second temperature sensing circuit is configured to operate at a selected one of multiple different bias parameter values; and
    wherein the first temperature sensing circuit includes a temperature sensing first mode and a load circuit second mode, wherein in the second mode the first temperature sensing circuit is selectively configurable to provide a uniform load condition to the second temperature sensing circuit using information about the selected bias parameter of the second temperature sensing circuit.

3. The temperature sensing system of claim 2, wherein the second temperature sensing circuit includes a semiconductor junction configured to operate at one of multiple different currents; and
    wherein the first temperature sensing circuit includes multiple switchable semiconductor junctions configured to use, in the second mode, information about the current through the semiconductor junction of the second temperature sensing circuit to provide a uniform current as the uniform load condition provided to the second temperature sensing circuit.

4. The temperature sensing system of claim 2, wherein the first temperature sensing circuit includes first and second diodes selectively coupled in parallel;
    wherein in response to a first bias current, the first diode is decoupled from the second diode, and the first diode is configured to provide a uniform load condition to the second temperature sensing circuit; and
    wherein in response to a different second bias current, the first and second diodes are coupled in parallel and are configured to provide a uniform load condition to the second temperature sensing circuit.

5. The temperature sensing system of claim 4, wherein the first and second diodes have different semiconductor junction areas.

6. The temperature sensing system of claim 1, wherein the digitizing encoder circuit includes an offset adjustment circuit configured to generate a first offset signal based on a characteristic of the digitizing encoder circuit, and further configured to generate a second offset signal based on a characteristic of the second temperature sensing circuit;
    wherein the digitizing encoder circuit is configured to encode the first analog signal into the temperature-indicating digital signal using the first offset signal, and the digitizing encoder is configured to encode the second analog signal into the temperature-indicating digital signal using the second offset signal.

7. The temperature sensing system of claim 6, wherein the offset adjustment circuit is configured to generate the second offset signal based on a characteristic semiconductor junction voltage induced by a reference current in the second temperature sensing circuit.

8. The temperature sensing system of claim 1, wherein the digitizing encoder circuit includes a sigma-delta analog-to-digital converter (ADC) circuit, and wherein the offset voltage signal is generated by successive approximation of the one of the first and second analog signals.

9. The temperature sensing system of claim 8, wherein the DAC circuit is configured to provide the analog offset voltage signal as a signal between about −10 mV and 10 mV when the offset voltage signal is generated by successive approximation of the first analog signal, and the DAC circuit is configured to provide the analog offset voltage signal as a signal between about 0 V and 1 V when the offset voltage signal is generated by successive approximation of the second analog signal.

10. The temperature sensing system of claim 1, wherein the second temperature sensing circuit includes first and second diodes arranged in an anti-parallel configuration or first and second diode-connected transistors that are arranged in an anti-parallel configuration.

11. The temperature sensing system of claim 1, wherein the first temperature sensing circuit includes a diode, and wherein the diode provides the temperature-indicating first analog signal as a forward bias voltage of the diode.

12. The temperature sensing system of claim 1, wherein the second temperature sensing circuit includes a bipolar junction transistor, wherein the base and collector of the transistor are electrically coupled, and wherein the transistor provides the temperature-indicating second analog signal as a base-emitter bias voltage of the transistor.

13. The temperature sensing system of claim 1, wherein the first and second temperature sensing circuits include respective semiconductor devices coupled in series.

14. The temperature sensing system of claim 1, wherein the second temperature sensing circuit is electrically coupled to a first reference ground, and wherein the digitizing encoder circuit is coupled to a different second reference ground.

15. A temperature sensing system for providing temperature-indicating output signals based on temperature-indicating analog signals from an off-die circuit, the temperature sensing system comprising:
   a temperature sensing circuit, located remotely from an integrated circuit die, the temperature sensing circuit configured to provide temperature-indicating analog signals in response to respective different bias parameter values;
   a load circuit, included on the integrated circuit die, the load circuit including at least two semiconductor junctions configured to provide an adjustable load condition to the temperature sensing circuit based on information about the selected bias parameter value of the temperature sensing circuit; and
   a digitizing encoder circuit, included on the same integrated circuit die as the load circuit, the digitizing encoder circuit coupled to the load circuit and to the temperature sensing circuit, the digitizing encoder circuit configured to encode the temperature-indicating analog signals from the temperature sensing circuit into a temperature-indicating digital signal and wherein the digitizing encoder circuit includes a feedback path with a digital-to-analog converter (DAC) circuit configured to provide an analog offset voltage signal at an input of the digitizing encoder circuit, wherein the offset voltage signal is based on one of the temperature-indicating analog signals from the temperature sensing circuit.

* * * * *